United States Patent [19]

Hedstrom et al.

[11] 4,076,157

[45] Feb. 28, 1978

[54] VEHICLE-TOP-CARRIER SUPPORT MEANS

[75] Inventors: Robert E. Hedstrom; Edmund W. Brown, both of Racine, Wis.

[73] Assignee: UPEC Corporation, Racine, Wis.

[21] Appl. No.: 706,917

[22] Filed: Jul. 19, 1976

[51] Int. Cl.² ............................................. B60R 9/04
[52] U.S. Cl. .................................. 224/42.1 E; 224/42.1 F
[58] Field of Search .................... 224/42.1 R, 42.1 B, 224/42.1 E, 42.1 F, 42.1 G; 248/225.3, 226.4, 227, 229, 503; 24/263 A; 214/450

[56] References Cited

U.S. PATENT DOCUMENTS

| 1,733,007 | 10/1929 | Dahl | 224/42.1 E X |
| 2,643,040 | 6/1953 | Hare | 224/42.1 E |

FOREIGN PATENT DOCUMENTS

| 224,470 | 7/1958 | Australia | 224/42.1 E |
| 183,191 | 4/1963 | Sweden | 224/42.1 E |
| 645,772 | 11/1950 | United Kingdom | 224/42.1 E |

Primary Examiner—Robert J. Spar
Assistant Examiner—Winston H. Douglas
Attorney, Agent, or Firm—Axel H. Johnson

[57] ABSTRACT

A means of supporting a carrier rack over the top of a vehicle comprising support members inserted in the rack and extending downwardly therefrom and resting in a gutter adjacent to the top. Tension members embrace the exterior of the gutter and extend divergently relative to the support members, and are anchored under tension to the transverse members of the carrier frame.

5 Claims, 3 Drawing Figures

VEHICLE-TOP-CARRIER SUPPORT MEANS

BACKGROUND OF THE INVENTION

1. Field of the Invention

This invention relates to means of supporting a carrier rack over the top of a vehicle which will assure adequate support for the rack, and of a construction that will not do damage to the vehicle.

2. Description of the Prior Art

The prior art embraces various means of supporting a carrier rack over the top of a vehicle, which supporting means may injure the finish and damage the vehicle because of the nature of the elements of the support means.

This invention generally, comprises a means of supporting a rack or carrier above the top of a vehicle for the purpose of carrying luggage or other material. This means comprises support members that rest in the usual gutter provided adjacent to the roof of the vehicle. A tension member embraces the exterior of the gutter and extends divergently toward a transverse member of the carrier frame, and is anchored thereto. Threaded means is provided on the tension member to secure the carrier against displacement: The result being a securing means defined by a closed triangle of forces.

An object of this invention is to provide a supporting means that secures the carrier frame to the top of the vehicle against displacement caused by sudden impacts or vibration. Another object is to provide defacing or otherwise damaging the body of the vehicle.

Referring to the drawings.

Figure 1:
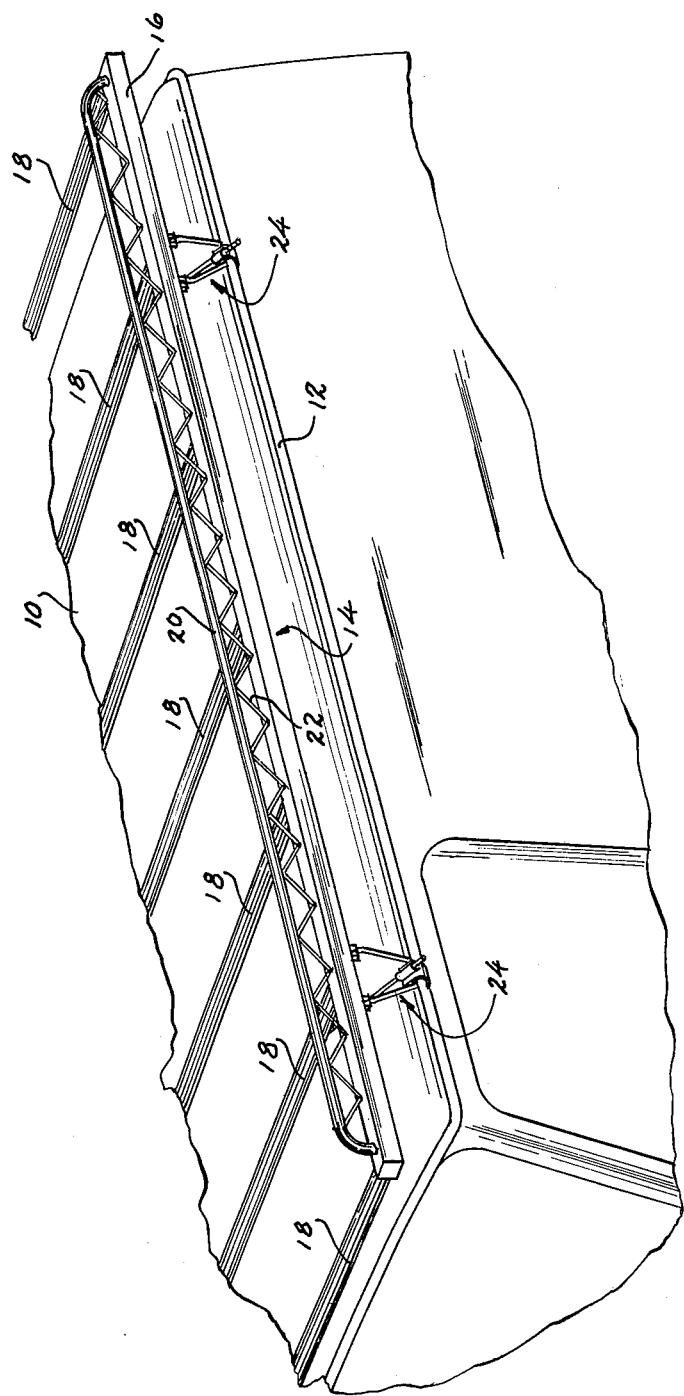
FIG. 1 is a perspective view of a portion of a vehicle showing a carrier mounted thereover.
Figure 2:
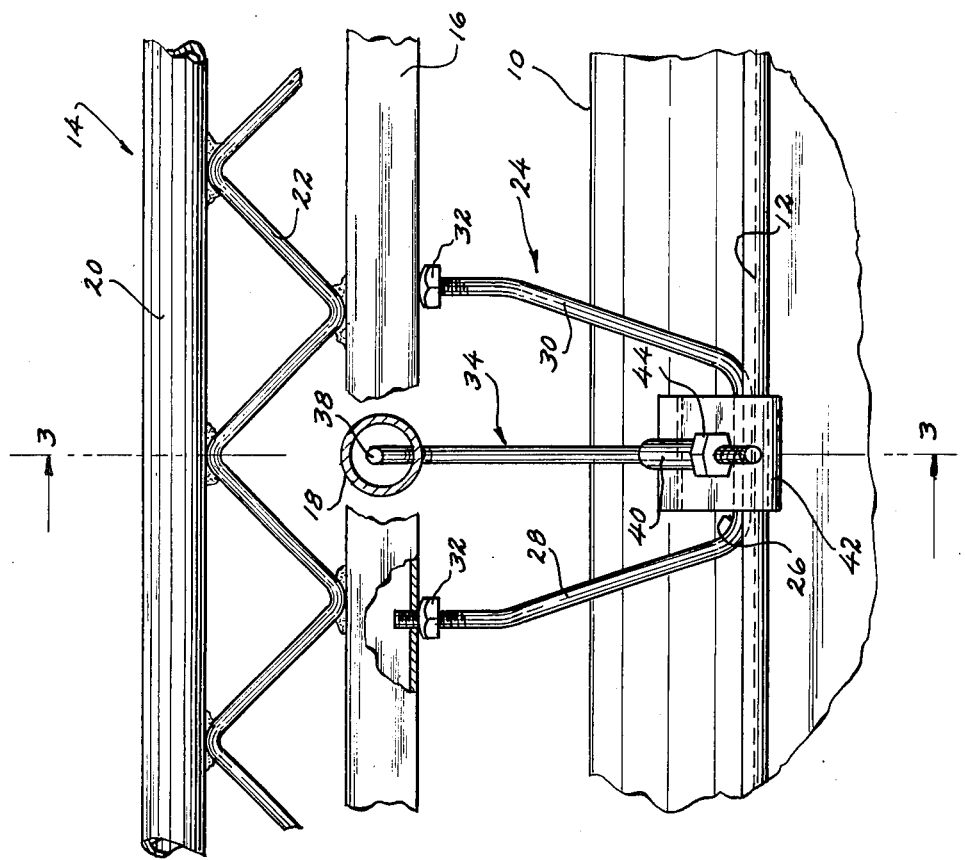
FIG. 2 is an enlarged fragmentary view of FIG. 1 showing a side view of the supporting means of the invention.
Figure 3:
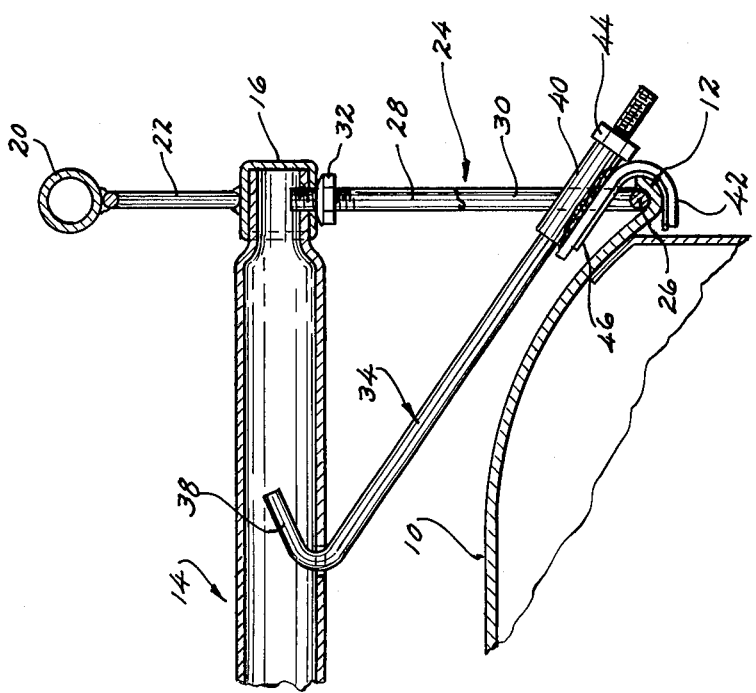
FIG. 3 is a sectional view taken at 3—3 of FIG. 2.

FIG. 1 shows a typical vehicle having a roof 10 provided with a gutter 12 which defines a deep channel extending along both sides of the roof 10. The carrier frame 14 extends substantially the full length of the roof 10, and at both sides thereof, and in this instance comprises longitudinal rectangular tubular members 16 positioned above the roof 10 one positioned at each edge of the roof 10; only one being shown.

Transverse tubular ribs 18 extend perpendicularly relative to tubular members 16, and are inserted in apertures in the latter. A tubular rail member 20 is positioned above each tubular member 16, parallel thereto, and secured at both ends thereof to members 16 by welding or other suitable means. A rod grill 22, comprising suitably-formed material, extends longitudinally between tubular members 16 and 20 for the purpose of stiffening the carrier and is welded to the tubular members at alternately-opposed points as shown.

The four supporting means 24 support the carrier above the top 10, each comprising a U-shaped member having a foot portion 26 terminating in upwardly-directed laterally-spaced legs 28 and 30. Foot portion 26 is seated in the groove or channel of the gutter 12. The upper ends of legs 28 and 30 are inserted in apertures in the lower wall of tubular member 16; these ends being threaded as shown. Nuts 32 are assembled thereon to provide an adjustment means and support for the carrier frame.

Tension member 34, of which there are four, has a hook 38 which is inserted in a suitable aperture in tubular rib 18. Members 34 extend divergently relative to supporting means 24 and terminate in a threaded portion. A sleeve 40 freely surrounds member 34 and which is slidable therein. A hook portion 42 embraces gutter 12, and sleeve 40 is welded thereto. A nut 44 is threadedly assembled in member 34.

When the carrier 14 is to be mounted upon the top of a vehicle, foot portion 26 of support member 24 is placed in the channel of the gutter 12, and the legs 28 and 30 are inserted into their respective apertures in tubular member 16. The latter resting upon the nuts 32 which nuts are adjusted on the legs 28 and 30, so as to level the carrier, and to assure the stability thereof. Tension member 34 is then inserted into the sleeve 40, and hook 38 is placed in a suitable aperture provided in tubular rib 18.

The final operation in completing the mounting of the carrier frame 14 over the top of the vehicle is to adjust nut 44 relative to the sleeve 40 so that foot portion 26 is in positive contact with the channel of gutter 12. This adjustment is repeated for each of the support members 24.

A pad of cushion material provides a lining for hook portion 42 to protect the finish of the exterior of the gutter and is indicated at 46.

The above being a complete description of an illustrative embodiment of the invention, what is claimed as new and desired to be secured by Letters Patent of the United States is:

1. A means of securing a carrier rack over the top of a vehicle said vehicle having a gutter adjacent said top, said carrier rack having a longitudinally-extending tubular member, and ribs extending substantially normal to, and integral with said longitudinal member, said means comprising a U-shaped member having a foot portion positioned in said gutter, and legs extending upwardly to engage apertures in said longitudinal member and abutting said longitudinal member, a tension membr spaced between the legs of said U-shaped member and being separable from said U-shaped member and said carrier rack, said tension member embracing the exterior of said gutter and extending divergently to engage one of said ribs at a point inwardly spaced from said longitudnal member, said tension member having a hook which engages an aperture in said one of said ribs at said inwardly spaced point and means on said tension member to secure said foot in positive engagement with said gutter.

2. A means of securing a carrier rack to the top of a vehicle, as set forth in claim 1, in which said means on said tension member comprises a threaded member co-operating with said tension member.

3. A means of securing a carrier rack to the top of a vehicle, as set forth in claim 1, in which said tension member at the embracement of the exterior of the gutter includes a cushion pad to protect the surface of the gutter.

4. A means of securing carrier rack to the top of a vehicle as set forth in claim 1, in which said legs terminate upwardly in threaded portions, said threaded portions being inserted into apertures in said longitudinal member, and threaded nut members engage said threaded portions and abut said longitudinal member.

5. A means of securing a carrier rack to the top of a vehicle as set forth in claim 1, in which a rail member extends longitudinally above, and parallel to said longitudinal member, and secured integrally to said longitudinal member at the extremities thereof, a grill member extending longitudinally between said rail member and said longitudinal member in alternately-directed oblque portions and secured integrally to said rail member and said longitudinally member alternately-opposed points of said members.

* * * * *